(12) United States Patent
Dodds et al.

(10) Patent No.: US 6,349,748 B1
(45) Date of Patent: Feb. 26, 2002

(54) INSULATED TUBING

(75) Inventors: John Joseph Dodds, Penn Township Westmoreland County, PA (US); Michael Posson, Midland, TX (US); Joseph A. Schwalbach, Midland, TX (US); Donald R. Warr, Midland, TX (US)

(73) Assignee: Robroy Industries, Inc., Verona, PA (US)

( * ) Notice: Subject to any disclaimer, the term of this patent is extended or adjusted under 35 U.S.C. 154(b) by 0 days.

(21) Appl. No.: 09/537,277

(22) Filed: Mar. 29, 2000

Related U.S. Application Data

(60) Provisional application No. 60/126,668, filed on Mar. 29, 1999.

(51) Int. Cl.[7] .................................................. F16L 9/14
(52) U.S. Cl. ........................ 138/149; 138/112; 138/113; 138/148
(58) Field of Search .......................... 138/112–114, 148, 138/149

(56) References Cited

U.S. PATENT DOCUMENTS

| | | | | |
|---|---|---|---|---|
| 2,531,658 A | * | 11/1950 | Walsh | 138/48 |
| 2,707,493 A | * | 5/1955 | Bonvillian et al. | 138/113 |
| 2,930,407 A | * | 3/1960 | Conley et al. | 138/64 |
| 3,490,496 A | * | 1/1970 | Stearns | 138/112 |
| 3,547,161 A | * | 12/1970 | Reece | 138/114 |
| 3,595,275 A | * | 7/1971 | Steans | 138/114 |
| 3,698,440 A | * | 10/1972 | Matthieu et al. | 138/149 |
| 3,933,182 A | * | 1/1976 | Costes | 138/149 |
| 5,476,343 A | * | 12/1995 | Sumner | 405/157 |
| 5,860,453 A | * | 1/1999 | Picking | 138/112 |
| 6,116,290 A | * | 9/2000 | Ohrn et al. | 138/149 |

* cited by examiner

Primary Examiner—Patrick Brinson
(74) Attorney, Agent, or Firm—Webb Ziesenheim Logsdon Orkin & Hanson, P.C.

(57) ABSTRACT

An insulated tubing is disclosed having a liner, a pipe surrounding the liner defining an annulus between the pipe and the liner, a plurality of sets of spacers, and an insulating material located between the liner and pipe, substantially filling the annulus. The spacers within a set of spacers are spaced apart from each other around the circumference of the liner and each set of spacers is spaced apart from each other set along the length of the liner. A method for producing the insulated tubing is also disclosed.

9 Claims, 6 Drawing Sheets

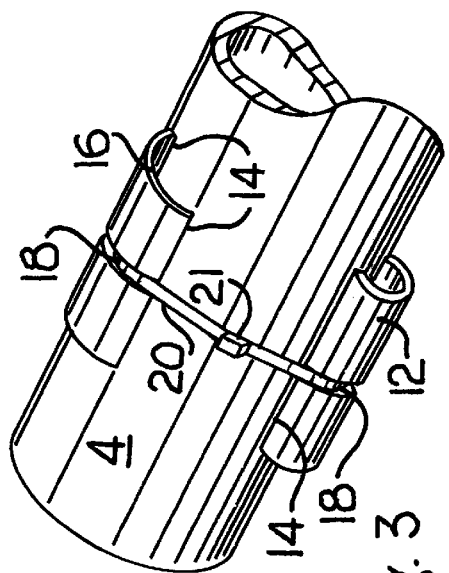
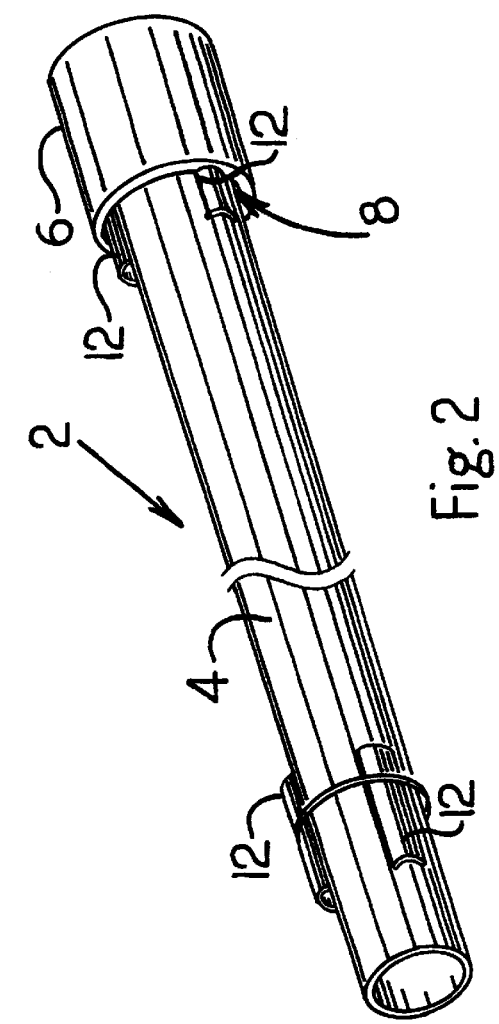
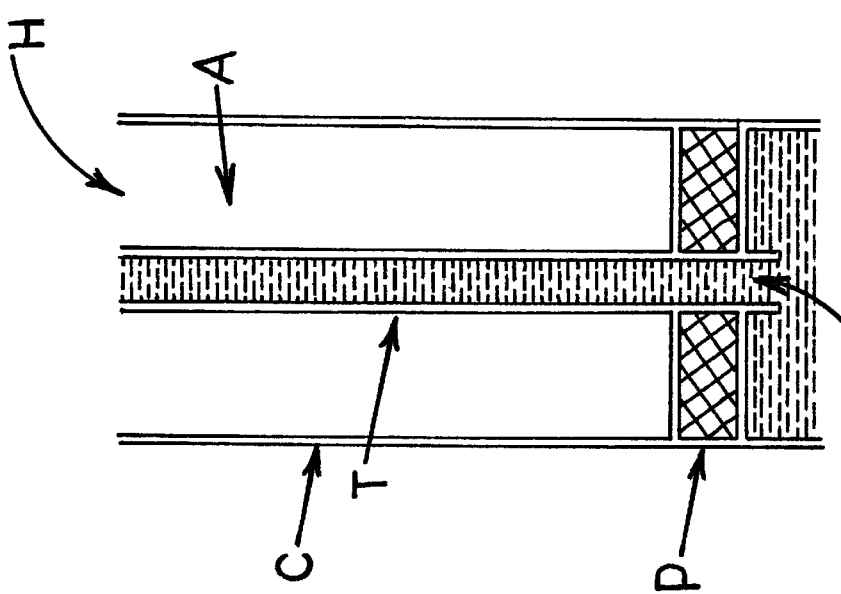
Fig. 1 PRIOR ART

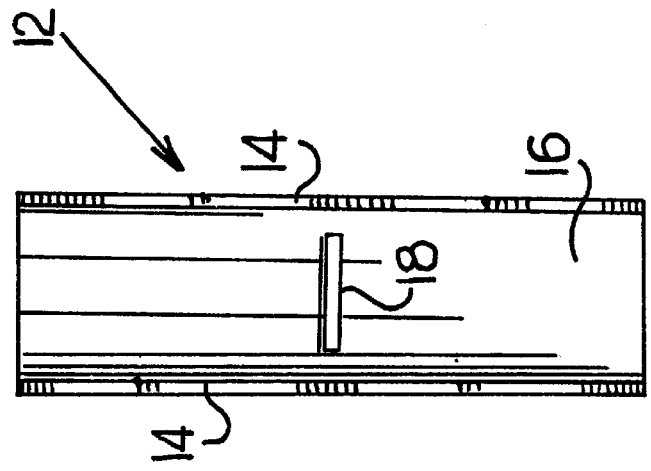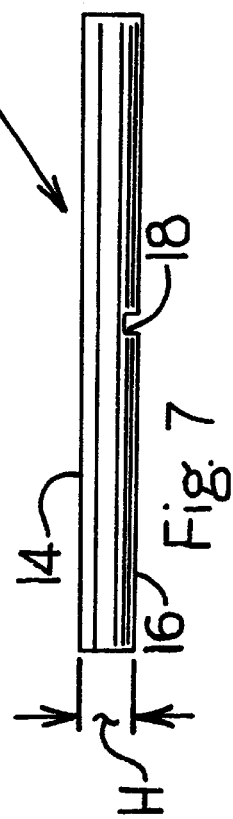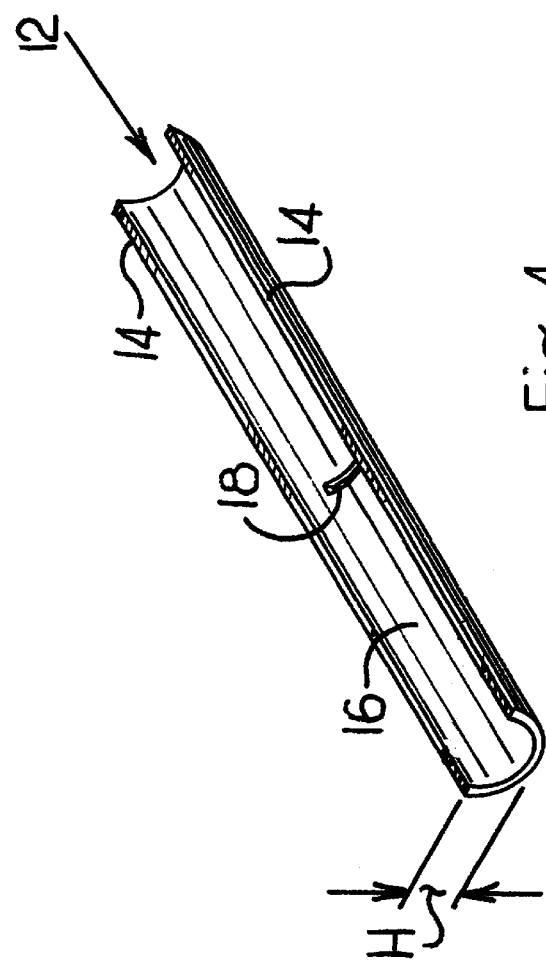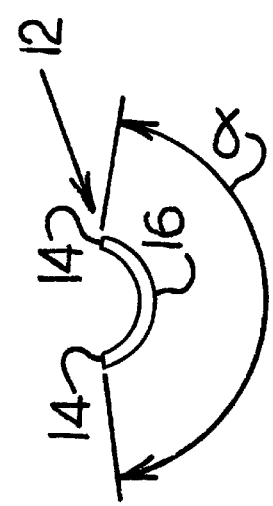

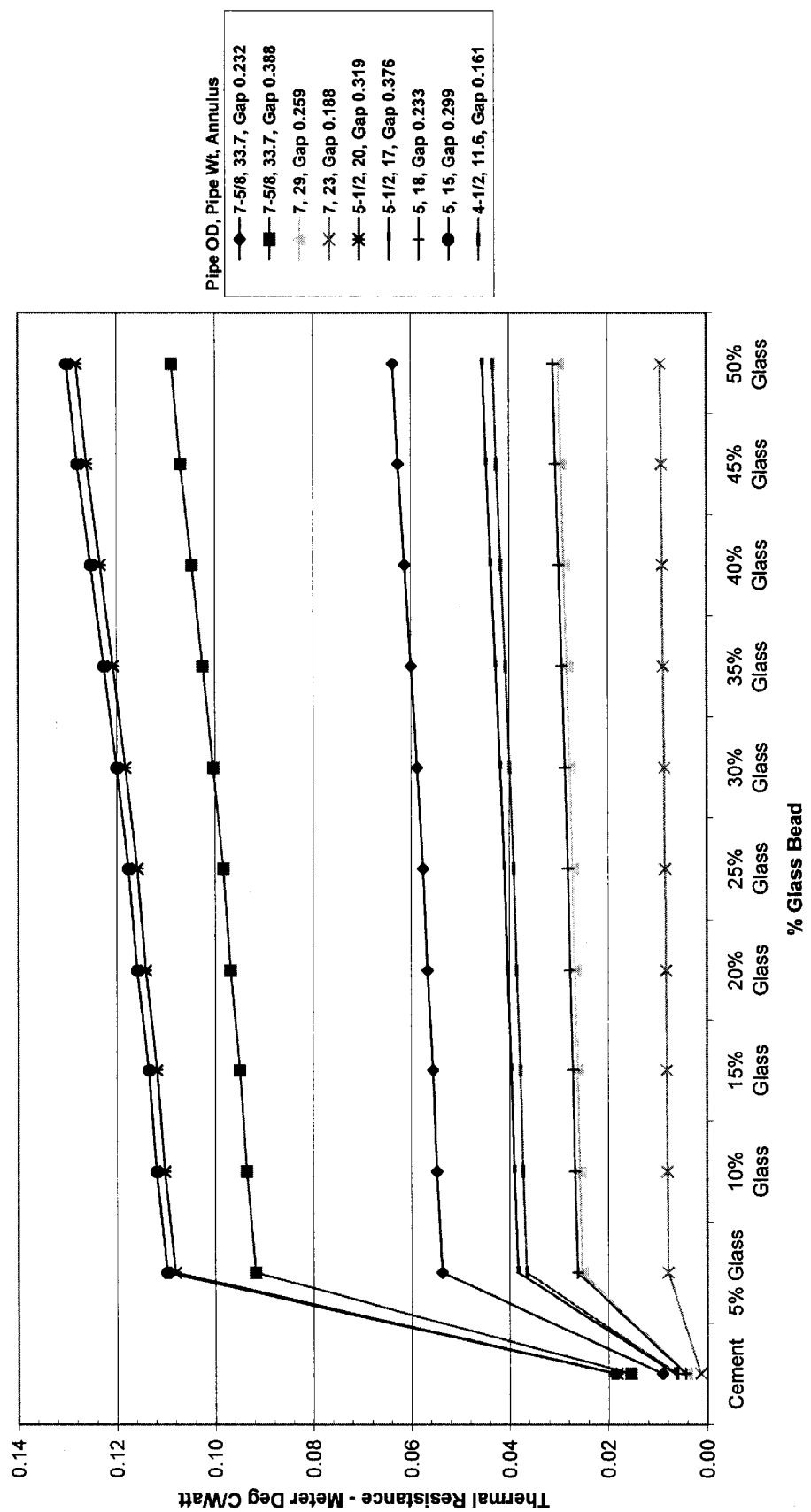

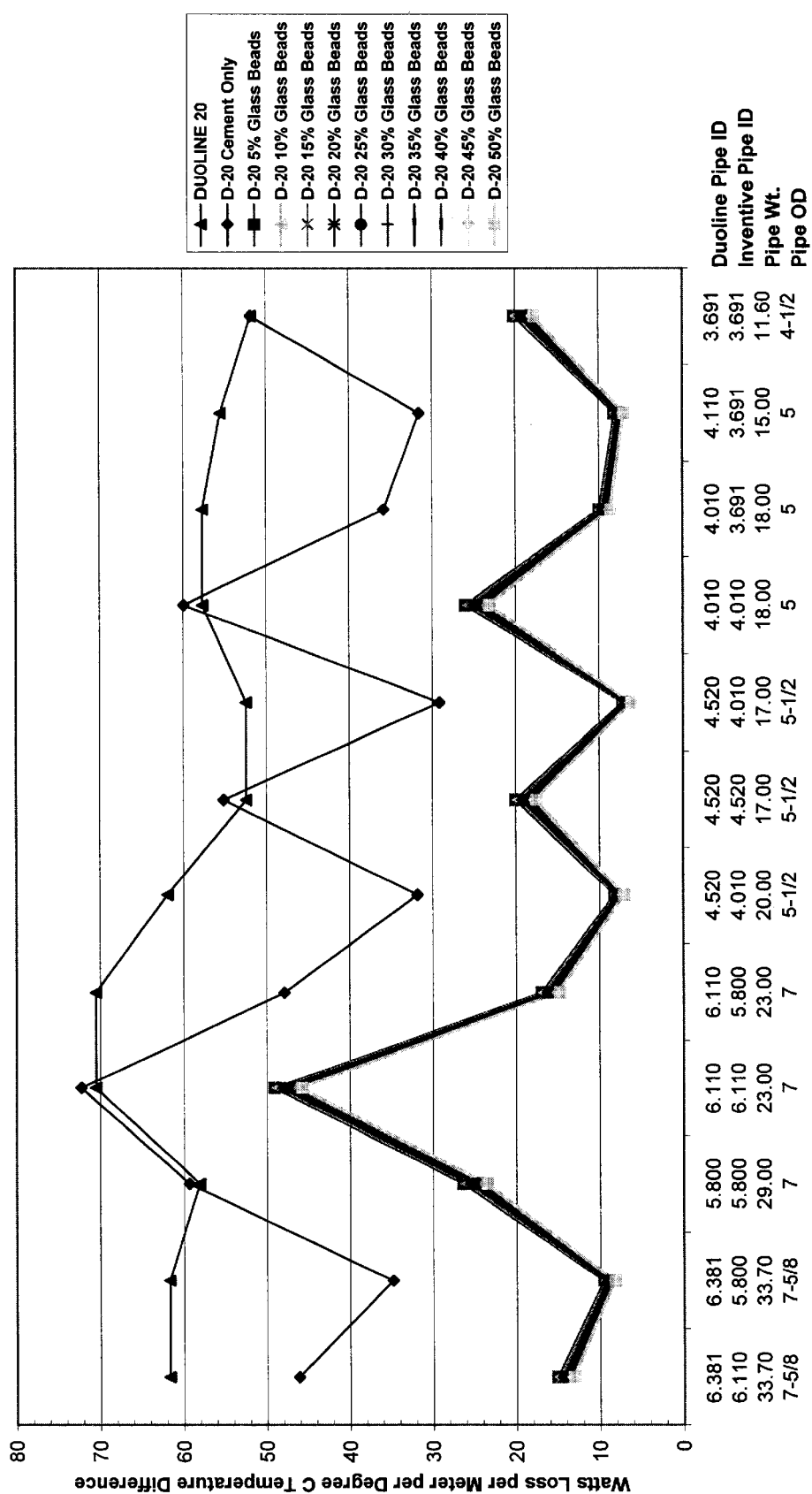
FIG. 11 - Thermal Loss vs. Pipe Diameter/Weight

INSULATED TUBING

CROSS-REFERENCE TO RELATED APPLICATIONS

This utility patent application claims priority from U.S. Provisional Patent Application No. 60/126,668, filed Mar. 29, 1999, which is herein incorporated by reference.

BACKGROUND OF THE INVENTION

1. Field of the Invention

The present invention relates to insulated tubing, in particular, steel pipe having a fiberglass liner with an insulating material in the space therebetween.

2. Prior Art

Conventional downhole oil drilling techniques typically require (as shown in FIG. 1) the use of a casing C positioned in a producing well H, a production tubing T positioned within the casing C and a packer P which centers the casing C and retains the production fluid F adjacent to the opening of the production tube T. Transport lines are pipes used to transport hydrocarbon fluids. In cold environments, hot hydrocarbon fluids passing through the production tubing T or transport lines contain paraffin and asphaltenes. As the hot fluids containing the paraffin and asphaltenes cool in the cold environment, the paraffin and asphaltenes solidify and form deposits in the production tubing or transport line. These deposits must be periodically cleaned out. Typically, the oil production process must be shut down to allow cleaning of the paraffin and asphaltene deposits.

Accordingly, a need remains for a device and method for transporting hot hydrocarbon fluids in a cool environment to prevent premature solidification of paraffin and asphaltenes entrained in the hydrocarbon fluids.

SUMMARY OF THE INVENTION

This need is met by the insulated tubing of the present invention. The insulated tubing includes an outer steel pipe and an inner fiberglass liner. The fiberglass liner is sized to provide a defined annulus between the liner and the pipe. The annulus between the liner and the pipe is filled with an insulating composition including a cementitious material and an additive. The additive lowers the K value of the cementitious material, thereby increasing the insulating properties of the insulating composition. Preferably, the cementitious material includes Portland cement and the additive includes glass beads or the like produced from fly ash, preferably on the order of about 30 microns in size. The amount of additive included in the insulating material and the radial thickness of the annulus filled with the insulating composition are dependent on the insulating needs of the tubing in a particular oil production environment.

The annulus between the liner and the pipe is maintained at approximately a constant thickness around the circumference of the liner by a plurality of sets of spacers positioned at spaced apart locations along the length of the liner. The constant thickness provides for substantially equal thermal insulation around all of the pipe. Each set of spacers preferably includes three spacers positioned equidistantly around the outer surface of the liner. The spacers are preferably formed in a U-shape or C-shape and are secured to the outside of the liner by a strap passing over each of the spacers. Preferably, each spacer includes a slot defined therethrough which accepts the strap to prevent the strap from slipping off the spacers. The spacers may be formed from a length of polyvinyl chloride (PVC) tubing cut longitudinally to create an elongated U-shaped member. The height of the spacers is dependent upon the size of the annulus between the liner and the tubing.

The insulated tubing is prepared by first attaching the spacers with the strap around the outside of the liner at defined intervals, preferably every four to five feet, with the length of the spacers being about four to five inches. The liner is inserted into the tubing and the insulating composition is pumped into the annulus between the liner and the tubing. The insulating composition flows in the gaps between the spacers. The insulating composition hardens and forms an insulating layer between the liner and the tubing.

A complete understanding of the invention will be obtained from the following description when taken in connection with the accompanying drawing figures wherein like reference characters identify like parts throughout.

BRIEF DESCRIPTION OF THE DRAWINGS

FIG. 1 is a side elevation view of a prior art tubing and casing inserted in a production well;

FIG. 2 is perspective view of a portion of tubing made in accordance with the present invention having a liner with spacers attached thereto inserted into a portion of pipe;

FIG. 3 is a perspective view of a portion of a liner with spacers attached thereto;

FIG. 4 is a perspective view of the underside of a spacer as shown in FIG. 2;

FIG. 5 is a plan view of the underside of the spacer shown in FIG. 4;

FIG. 6 is an end view of the spacer shown in FIG. 4;

FIG. 7 is a side view of the spacer shown in FIG. 4;

FIG. 10 is a graph of thermal resistance of the insulating material versus percent by weight of glass beads added to the insulating material;

FIG. 11 is a graph of thermal loss versus pipe diameter and weight; and

DETAILED DESCRIPTION OF THE PREFERRED EMBODIMENT

Figure 9:
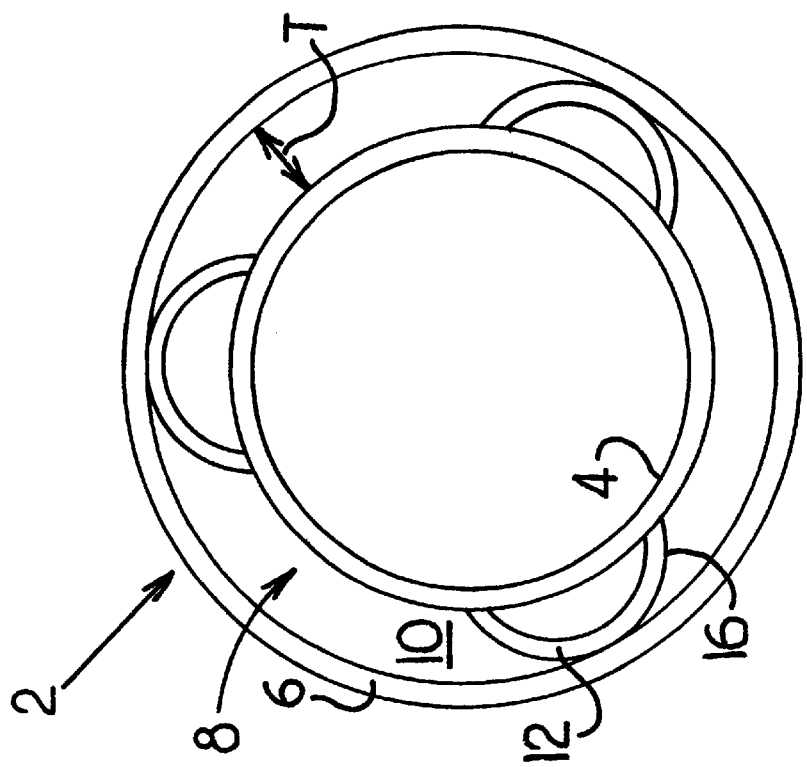
FIG. 9 is a cross-section view of insulated tubing shown in FIG. 8 made at a position spaced apart from the cross-section shown in FIG. 8 wherein the strap is not visible.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The insulated tubing made in accordance with the present invention is similar in structure to the RICELINE 20 and DUOLINE 20 tubings with DUOLINE liners available from Rice Engineering of Midland, Tex. In these prior art lined tubings, an annular space between an inner surface of a steel pipe and an outer surface of a liner is filled with a mortar layer which is inserted therebetween under pressure. The thickness of the mortar layer between the liner and steel pipe is only a few thousandths of an inch, typically about 0.03 to 0.1 inch, which provides minimal insulation to the production fluid passing through the liner.

In the present invention, the annular space between the liner and pipe of the prior art tubings is increased to approximately 0.1 to 0.4 inch to accommodate an insulating composition. As shown in FIG. 2, the insulated tubing 2 of the present invention includes an inner liner 4 and an outer pipe 6 with an annulus 8 therebetween. As will be described below, the annulus 8 is filled with an insulating material 10 (shown in FIGS. 8 and 9). The outer pipe 6 preferably is made of steel. The liner 4 preferably is made of fiberglass. The inside diameter and outside diameter of the liner 4 are determined by the insulating needs of the particular application as described in detail below.

A plurality of sets of spacers 12 are positioned at spaced apart positions on the outer surface of the liner 4 along the length of the liner 4. Preferably, each set of spacers 12 includes three spacers 12 positioned equidistantly apart around a circumference of the outer surface of the liner 4. When three spacers 12 are used, each spacer 12 is positioned about 120° from each other. For typical downhole tubing made in lengths of about forty feet, the sets of spacers 12 are preferably positioned about every four to five feet. The plurality of sets of spacers 12 center the liner 4 within the outer pipe 6 thereby maintaining the annulus 8 at a substantially constant thickness. A constant annulus 8 thickness leads to equal thermal insulation around the liner 4.

As shown in FIGS. 3–7, the spacers 12 are preferably formed from a portion of tubing, preferably Schedule 40 polyvinyl chloride (PVC) tubing. A length of PVC tubing is cut longitudinally to produce a spacer 12, preferably having a general U-shape or C-shape with a pair of edges 14 and an arcuate section 16. The spacers 12 are preferably about four to five inches in length. The height H of the spacers 12 determines the angle $\alpha$ that the edges 14 of the spacer 12 make with each other. In a preferred embodiment, $\alpha$ is about 163°. For tubing 2 requiring much insulating material 10, the annulus 8 must be relatively large, hence, the angle $\alpha$ is correspondingly larger (i.e., greater than about 163°) to achieve a greater height H in the spacers 12 to fill the annulus 8.

A notch 18 is defined in the arcuate section 16 of the spacer 12. As shown in FIG. 3, the notches 18 are sized to accept a fastening strap 20 therein. The strap 20 extends around the set of spacers 12 and is positioned within the notch 18 of each spacer 12. Preferably, the strap 20 includes a flexible plastic strip with a locking mechanism 21 for securing the ends of the strap together. The strap 20 maintains the edges 14 of the spacers 12 in engagement with the outer surface of the liner 4, while the notches 18 prevent the strap 20 from slipping off the ends of the spacers 12.

Figure 8:
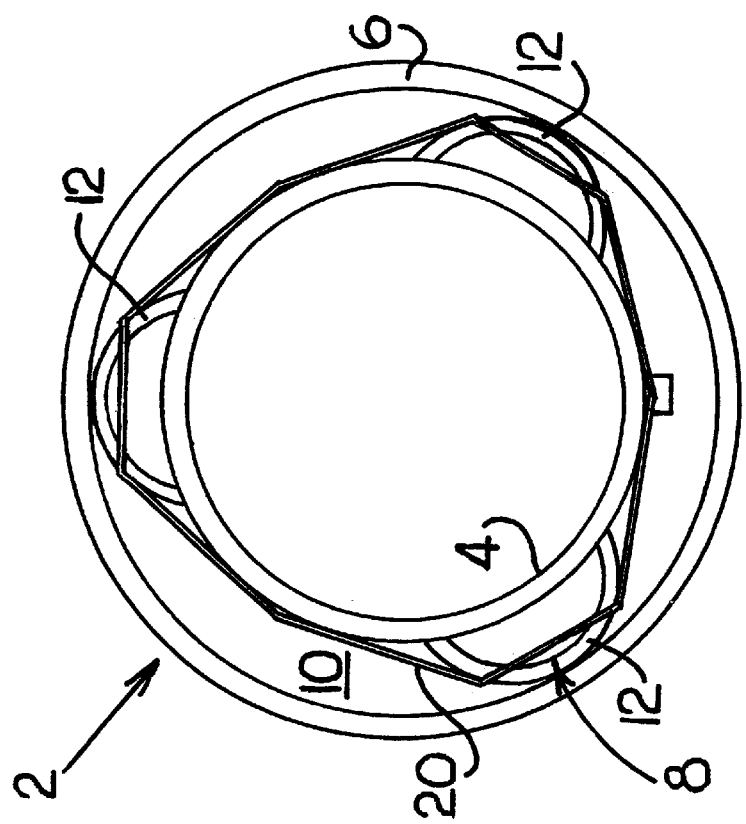
FIG. 8 is a cross-section view of the insulated tubing made in accordance with the present invention showing a liner, spacers, strap, insulating material, and tubing.

Referring to FIGS. 8 and 9 the insulating material 10 includes hardened cementitious material containing an insulating additive. The cementitious material is preferably Portland cement but may include other hardenable cements or mortars. Preferably, the additive includes a plurality of cenospheres, (small glassy particles characteristic of pulverized fuel ash, referred to hereinafter as glass beads). The glass beads preferably have a size of about thirty microns. The relative amount of glass beads added to the cementitious material is determined by the degree of insulation required for the tubing 2. Preferably, approximately 5 to 50 weight percent of glass beads are added. While more than 50 weight percent of glass beads may be utilized, over 50 weight percent increases costs more than the value gained in thermal resistance.

FIG. 10 is a graph of the thermal resistance of compositions of Portland cement containing glass beads versus the percent by weight of the glass beads in the cement. The graph depicts thermal resistance for various combinations of outside diameter pipe, pipe weight in pounds per foot, and annulus thickness. As shown in the graph, at approximately 5 weight percent of glass beads, an increased thermal resistance is achieved over cement. At approximately 50 weight percent of glass beads, the thermal resistance has not varied significantly from the 5 weight percent mark. Above 50 weight percent, the thermal resistance does slightly improve; however, the cost involved with the increase of glass beads becomes prohibitive.

FIG. 11 is a graph of thermal loss versus pipe diameters and pipe weight. The prior art DUOLINE 20 and cement only filled tubings were compared with the present invention having various compositions of glass bead additive. As shown by the graph, the present invention reduces thermal loss over the prior art.

Referring to FIG. 9, the thickness T of the annulus 8 filled with the insulating material 10 is preferably about 0.1 to 0.4 inch. The lower end of this range is useful when relatively less insulation is required in the tubing 2 such as when the temperatures of the environment are relatively high. The higher end of the range of thicknesses of the insulating material 10 is necessary for relatively colder environments, although this requires that the liner 4 has a smaller inner diameter and, thus, a lower throughput of production fluid is achievable. In contrast, higher throughput may be accomplished where insulation demands are not as great and the thickness of the insulating material 10 is reduced and a larger inside diameter liner 4 may be used.

Figure 12:
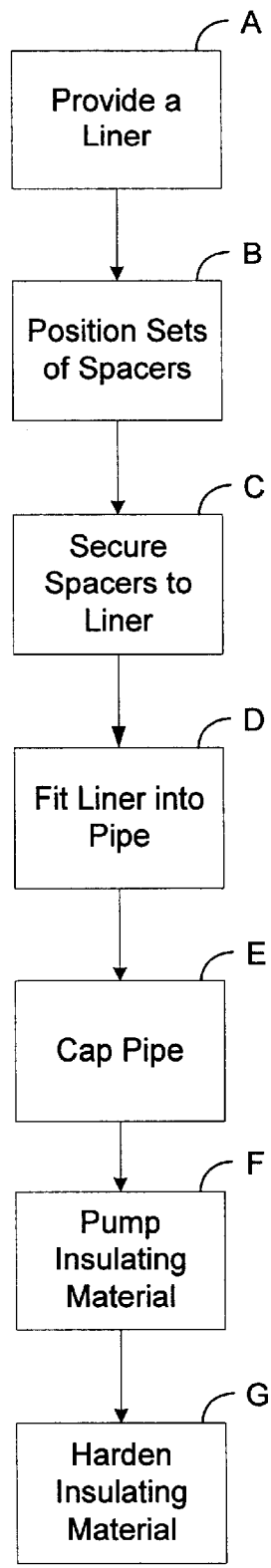
FIG. 12 is a schematic block diagram for producing an insulated tubing according to the present invention.

Referring to FIG. 12, the insulated tubing 2 is preferably produced by providing a liner in step A. Sets of the spacers 12 are positioned along the liner 4 at predetermined intervals along the length of the liner 4 in step B. In step C, the plurality of sets of spacers are secured to the liner. The spacers 12 may be secured to the liner 4 by extending a strap 20 around each set of the spacers 12 and positioning the strap 20 in the notches 18. The liner 4 bearing the spacers 12 with straps 20 is fitted into a pipe 6 thereby creating the annulus 8 in step D. One end of the pipe 6 is capped in step E and the insulating material 10 is pumped in a wet state into the other end of the pipe 6 in step F. The insulating material 10 flows through the annulus 8, in between the spacers 12, underneath the spacers 12. Lastly, in step G, the insulating material is hardened.

Although the present invention has been described for use in tubings for downhole oil production, it may be used in a variety of circumstances throughout the petrochemical and industrial chemical industries wherever insulated pipe is required.

We claim:

1. An insulated tubing, comprising:
    a liner having a length and an outer surface with a circumference;
    a pipe surrounding the liner defining an annulus between the pipe and the liner;
    a plurality of sets of spacers, each spacer of one set of spacers located on the outer surface of the liner and spaced apart from the others of the set of spacers around the circumference of the liner, and each set of spacers spaced apart from each other along the length of the liner;

an insulating material located between the liner and the pipe and substantially filling the annulus; and a plurality of straps, each strap surrounding one of the plurality of sets of spacers.

2. The insulated tubing according to claim 1, wherein each spacer has a notch configured to receive the strap therein.

3. The insulated tubing according to claim 2, wherein each spacer is generally U-shaped with U ends and positioned on the outer surface of the liner such that the U ends lie against the outer surface of the liner.

4. The insulated tubing according to claim 1, wherein each set of spacers includes three spacers.

5. The insulated tubing according to claim 1, wherein the insulating material comprises a cementitious material and an insulating additive.

6. The insulated tubing according to claim 5, wherein the insulating additive comprises glass beads.

7. The insulated tubing according to claim 1, wherein the layer of an insulating material is about ¼ to ⅜ inch thick.

8. A method of producing an insulated pipe, comprising the steps of:

providing a liner;

positioning a plurality of sets of spacers along the liner in predetermined intervals along a length of the liner;

securing the plurality of sets of spacers to the liner;

fitting the liner with the secured plurality of sets of spacers into a pipe, thereby defining an annulus between the liner and the pipe;

capping one end of the pipe; and pumping an insulating material in a fluid state into the annulus; and hardening the insulating material.

9. The method of producing an insulated pipe according to claim 8, wherein the step of securing the plurality of sets of spacers to the liner includes the steps of:

extending one of a plurality of straps around each set in the plurality of sets of spacers; and positioning each of the plurality of straps within a notch located in each spacer.

* * * * *